United States Patent
Kazmi et al.

(10) Patent No.: US 11,336,420 B2
(45) Date of Patent: May 17, 2022

(54) METHODS AND WIRELESS COMMUNICATION NODES FOR IMPROVING TRANSMISSION LINK PERFORMANCE

(71) Applicant: Telefonaktiebolaget LM Ericsson (publ), Stockholm (SE)

(72) Inventors: Muhammad Kazmi, Sundbyberg (SE); Esther Sienkiewicz, Ottawa (CA); Thomas Chapman, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/766,792

(22) PCT Filed: Dec. 18, 2017

(86) PCT No.: PCT/SE2017/051287
§ 371 (c)(1),
(2) Date: May 26, 2020

(87) PCT Pub. No.: WO2019/125234
PCT Pub. Date: Jun. 27, 2019

(65) Prior Publication Data
US 2020/0304275 A1    Sep. 24, 2020

(51) Int. Cl.
*H04L 5/00* (2006.01)
*H04L 1/16* (2006.01)
(Continued)

(52) U.S. Cl.
CPC .......... *H04L 5/0094* (2013.01); *H04L 1/1642* (2013.01); *H04L 27/2607* (2013.01); *H04W 4/027* (2013.01); *H04W 72/10* (2013.01)

(58) Field of Classification Search
CPC . H04L 5/0094; H04L 1/1642; H04L 27/2607; H04L 27/2602; H04L 5/0053; H04L 5/0007; H04W 4/027; H04W 72/10
See application file for complete search history.

(56) References Cited

U.S. PATENT DOCUMENTS

2007/0195690 A1* 8/2007 Bhushan ............... H04L 5/0048
370/208
2015/0358983 A1* 12/2015 Frenger ............... H04W 72/085
370/329
(Continued)

FOREIGN PATENT DOCUMENTS

EP      3029901 A1 *  6/2016   ........... H04B 7/0695
WO   WO-2017219320 A1 * 12/2017   ............. H04L 27/26

OTHER PUBLICATIONS

PCT International Search Report and Written Opinion, dated Sep. 13, 2018, for International Application PCT/SE2017/051287, 10 pages.
(Continued)

*Primary Examiner* — Tejis Daya
(74) *Attorney, Agent, or Firm* — Sage Patent Group

(57) ABSTRACT

A method for improving transmission link performance, performed by a first communication node for wireless communication with a second communication node is provided. The method includes obtaining information of a delay spread of first signals sent between the first communication node and the second communication node and determining at least one of a plurality of different values of a sub-carrier spacing for transmission of second signals between the first communication node and the second communication node, based on the obtained information of the delay spread. The method further includes initiating transmission of the second signals between the first communication node and the sec-
(Continued)

ond communication node based on the determined at least one value of the sub-carrier spacing.

18 Claims, 11 Drawing Sheets

(51) Int. Cl.
*H04L 27/26* (2006.01)
*H04W 4/02* (2018.01)
*H04W 72/10* (2009.01)

(56) References Cited

U.S. PATENT DOCUMENTS

| 2016/0285599 | A1* | 9/2016 | Shahar | H04L 5/1469 |
| 2016/0352551 | A1* | 12/2016 | Zhang | H04L 5/0007 |
| 2017/0111930 | A1 | 4/2017 | Rajagopal et al. | |
| 2017/0265091 | A1* | 9/2017 | Yan | H04B 7/0632 |
| 2018/0054292 | A1* | 2/2018 | Yang | H04L 27/2646 |
| 2018/0270799 | A1* | 9/2018 | Noh | H04L 1/1812 |
| 2019/0081842 | A1* | 3/2019 | Kim | H04L 27/26025 |
| 2020/0128578 | A1* | 4/2020 | Park | H04L 5/00 |
| 2020/0336249 | A1* | 10/2020 | Yl | H04L 5/00 |

OTHER PUBLICATIONS

Armada, Ana Garcia et al., "Phase Noise and Sub-Carrier Spacing Effects on the Performance of an OFDM Communication System", Jan. 1998, pp. 11-13, IEEE Comm. Letters.

\* cited by examiner

METHODS AND WIRELESS COMMUNICATION NODES FOR IMPROVING TRANSMISSION LINK PERFORMANCE

CROSS-REFERENCE TO RELATED APPLICATIONS

This application is a 35 U.S.C. § 371 national stage application for International Application No. PCT/SE2017/051287, entitled "METHODS AND WIRELESS COMMUNICATION NODES FOR IMPROVING TRANSMISSION LINK PERFORMANCE", filed on Dec. 18, 2017, the disclosures and contents of which are hereby incorporated by reference in their entireties.

TECHNICAL FIELD

The present disclosure relates generally to methods and wireless communication nodes for handling wireless transmission of signals between the wireless communication nodes. More specifically, the present disclosure relates to a method performed by a first communication node, and the first communication node, and a method performed by a second communication node and the second communication node for improving transmission link performance for a wireless transmission link between the first communication node and the second communication node.

BACKGROUND

During the wireless communication era, wireless digital communication systems have used different technologies for transporting wireless signals between a User Equipment (UE) and a network node, e.g. a base station. For example, second generation mobile communication systems such as Global System for mobile Communication (GSM) used Time Division Multiple Access (TDMA) technology, and third generation mobile communication systems such as Universal Mobile Telecommunications System (UMTS) used Code Division Multiple Access (CDMA) technology. When the fourth generation mobile communication system Long Term Evolution (LTE) was developed, Orthogonal Frequency-Division Multiple Access (OFDMA) technology was used. OFDMA is also used in the currently developed fifth generation technology New Radio (NR). Other examples of OFDMA based multiple access schemes are Single-Carrier FDMA (SC-FDMA), which may also interchangeably be called Linearly Pre-coded OFDMA (LP-OFDMA) or discrete Fourier transform (DFT)-spread-OFDM (DFT-s-OFDM).

In NR, multiple different numerologies are supported for transmission and/or reception of signals between the UE and the network node. The term numerology is used in 3GPP and refers to waveform parametrization in OFDM based systems e.g. LTE, Narrowband Internet of Things (NB-IoT) and NR. More generally, the term numerology characterizes parameters of a signal transmitted between the UE and the network node. The term numerology may indicate one or more of the following characteristics: frame duration, subframe duration, Time Transmission Interval (TTI) duration, slot duration, mini-slot duration, symbol duration, sub-carrier spacing, number of subcarriers per physical channel such as Resource Blocks (RB), number of RBs within the bandwidth, and cyclic prefix (CP). In general, a numerology may indicate the bandwidth, in frequency domain, of a sub-carrier of a carrier, and/or the number of subcarriers in a carrier, and/or the numbering of the sub-carriers in a carrier. Different numerologies may in particular be different in the frequency separation of subcarriers, also called sub-carrier spacing. In some variants, all the sub-carriers in a carrier have the same mutual sub-carrier spacing. In another alternative, the numerology may be different between carriers in particular regarding the sub-carrier spacing. It is also possible to multiplex numerologies within a carrier. A symbol time length, and/or a time length of a timing structure pertaining to a carrier may be dependent on the carrier frequency, and/or the sub-carrier spacing and/or the numerology. In particular, different numerologies may have different symbol time lengths or symbol durations as already described above. Furthermore, the numerology may be configured or configurable, e.g. for one or more carriers.

A scaling approach, based on a scaling factor $2^N$, $N=1, 2, \ldots$ is considered for deriving subcarrier spacing for NR, e.g. 15 kHz, 30 kHz, 60 kHz, 120 KHz, 240 KHz etc. The numerology-specific time resource durations, e.g. slot, or subframe, can then be determined in ms based on the subcarrier spacing: subcarrier spacing of $(2^N*15)$ kHz gives exactly $½^N$ ms. Table 1 illustrates examples of different numerologies that time-frequency resources in NR may have in terms of sub-carrier spacing, slot duration, symbol duration, and CP duration.

| Numerology attribute | Numerology parameter values Subcarrier spacing | | | | |
|---|---|---|---|---|---|
| | 15 kHz | 30 kHz | 60 kHz | 120 kHz | 240 kHz |
| Slot duration | 500 µs | 250 µs | 125 µs | 62.5 µs | 31.25 µs |
| OFDM symbol, duration | 66.67 µs | 33.33 µs | 16.67 µs | 8.335 µs | 4.1675 µs |
| Cyclic prefix, duration | 4.76 µs | 2.38 µs | 1.19 µs or 4.16 | 0.595 µs | 0.2975 µs |
| OFDM symbol including cyclic prefix | 71.43 µs | 35.71 µs | 17.86 µs | 8.93 µs | 4.465 µs |

Existing wireless communication systems typically operate at $10^{-1}$ i.e. 10% reliability in terms of packet error rate and round trip time, RTT, for packet delivery in the order of tens of ms e.g. 10-100 ms. Examples of such systems are UTRAN, LTE, and NR. The requirements for critical machine type communication (C-MTC) are very stringent. They are expressed in terms of delay and reliability and also often called as Ultra-Reliable and Low Latency Communications (URLLC). Examples of delay and reliability targets for C-MTC are very short end-to-end delay or around trip delay e.g. between 1-10 ms, and very high reliability of data transmission, e.g. packet delivery error rate not exceeding $10^{-9}$.

LTE achieves increased channel bandwidth by means of Carrier Aggregation (CA). CA may imply increased overhead due to the need to carry e.g. control information for the involved carriers. Individual LTE carriers are limited to a maximum of 20 MHz bandwidth. There are no means in LTE to introduce increased bandwidth in a backward compatible manner. For NR, it is proposed to operate wider channel bandwidths than 20 MHz. Currently, the proposal is to support up to 100 MHz bandwidth for carrier frequencies below 6 GHz, and 400 MHz bandwidth for carrier frequencies above 6 GHz. In the future, even wider channel bandwidths may be introduced in a backward compatible manner.

A single carrier needs be processed in both the transmitter and the receiver side by a single Fast Fourier Transform (FFT) unit. Current hardware technology restricts FFT sizes to around 4096. The supportable bandwidth is set by the number of useful sub-carriers in the FFT and the subcarrier spacing. Thus, numerologies with a larger sub-carrier spacing are able to support a wider channel bandwidth than numerologies with a lower sub-carrier spacing.

In a multipath fading channel, the link performance of a numerology is dominated by a number of factors: phase noise generated by the base station, movement of the receiver relative to the transmitter, channel estimation performance and receiver equalization performance. The phase noise generated by the base station can cause a loss of orthogonality between subcarriers. The phase noise spectrum around each sub-carrier decays with increasing frequency. Thus, inter-sub-carrier interference decreases with increased sub-carrier spacing. Movement of the receiver relative to the transmitter causes Doppler spread, which can also degrade the orthogonality between sub-carriers. The impact of Doppler spread on link performance decreases with increasing sub-carrier spacing. Channel estimation is used to drive the receiver equalization algorithm and thus channel estimation performance impacts link level performance. Channel estimation relies on interpolation between reference samples, at least in the frequency domain. Increased sub-carrier spacing decreases the sampling of the channel in the frequency domain and may reduce channel estimation quality. When the channel estimation is used as an input to a receiver equalization algorithm such as Linear Minimum Mean Square Error (LMMSE), or Maximum Ratio Combining (MRC) or Interference Rejection Combining (IRC), link level performance may be degraded. The impact of these aspects of link level performance in particular, is that different numerologies may be optimal for different frequency ranges. For example, the numerologies corresponding to 60, 120 and 240 kHz sub-carrier spacings may be applied for frequencies above 24 GHz in NR. On the other hand, the numerologies corresponding to 15, 30 and 60 kHz sub-carrier spacings may be applied for frequencies up 6 GHz in NR.

A base station (BS) may communicate with one or more UEs on multiple numerologies simultaneously. There exist in principle at least three possibilities for how a communication network may manage multiple numerologies in NR:

The different numerologies may be configured as different carriers by the BS. The BS may allocate UEs to carriers dependent on the numerologies selected for the UEs;

A single carrier may be configured and semi-statically partitioned into two numerologies. The BS may periodically adjust the static partitioning;

Numerologies may be managed by the scheduler on a fast basis, and the scheduler would allocate both Physical Resource Blocks (PRBs) and assigned numerologies to UEs.

SUMMARY

The NR will operate over a wide range of frequencies, e.g. from 450 MHz to 70 GHz, with different possible channel bandwidths, e.g. from 5 MHz to 400 MHz or even 1 GHz in future. The UE may also be required to be served with one or a plurality of services, which may require very different quality of service requirements e.g. enhanced mobile broadband (eMBB), Ultra Reliable Low Latency Communication (URLLC), etc.

Dynamically changing numerology in an optimal manner, when multiple numerologies are available in the network node, e.g. base station for scheduling, is a great challenge since several parameters and conditions will affect wireless transmission performance between a UE and a network node. Therefore, a mechanism is required to optimally select the most suitable numerology for scheduling transmission of wireless signals between a UE and a network node, or between any other two wireless communication nodes, of a wireless communication network.

It is an object of the invention to address at least some of the problems and issues outlined above. It is possible to achieve these objects and others by using a method and an apparatus as defined in the attached independent claims.

It has been found that information of the current delay spread of wireless signals sent between a first communication node and a second communication node can be used for selecting sub-carrier spacing in order to increase wireless transmission performance. For a comparatively low delay spread, a first low sub-carrier spacing is to be used, whereas for a delay spread that is higher than the comparatively low delay spread, a second sub-carrier spacing that is higher than the first low sub-carrier spacing is to be used. Hereby, the performance of the wireless link is increased.

According to one aspect, a method is provided, performed by a first communication node for wireless communication with a second communication node. The method comprises obtaining information of a delay spread of first signals sent between the first communication node and the second communication node, and determining at least one of a plurality of different values of a sub-carrier spacing for transmission of second signals between the first communication node and the second communication node, based on the obtained information of the delay spread. The method further comprises initiating transmission of the second signals between the first communication node and the second communication node based on the at least one determined value of sub-carrier spacing.

According to another aspect, a method is provided performed by a second communication node for wireless communication with a first communication node. The method comprises receiving, from the first communication node, information of a value of sub-carrier spacing determined based on a delay spread of first signals sent between the first communication node and the second communication node. The method further comprises either receiving, from the first communication node, second signals based on the value of the sub-carrier spacing, or transmitting, to the first communication node, second signals based on the value of the sub-carrier spacing.

According to another aspect, a first communication node is provided, operable in a wireless communication system for wireless communication with a second communication node. The first communication node comprises processing circuitry and a memory. The memory contains instructions executable by said processing circuitry, whereby the first communication node is operative for obtaining information of a delay spread of first signals sent between the first communication node and the second communication node, and determining at least one of a plurality of different values of a sub-carrier spacing for transmission of second signals between the first communication node and the second communication node, based on the obtained information of the delay spread. Further, the first communication node is operative for initiating transmission of the second signals between the first communication node and the second communication node based on the determined at least one value of the sub-carrier spacing.

According to another aspect, a second communication node is provided, operable in a wireless communication system, for wireless communication with a first communication node. The second communication node comprises a processing circuitry and a memory. The memory contains instructions executable by said processing circuitry, whereby the second communication node is operative for receiving, from the first communication node, information of a value of sub-carrier spacing determined based on a delay spread of first signals sent between the first communication node and the second communication node, and receiving, from the first communication node, second signals based on the value of the sub-carrier spacing, or transmitting, to the first communication node, second signals based on the value of the sub-carrier spacing.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
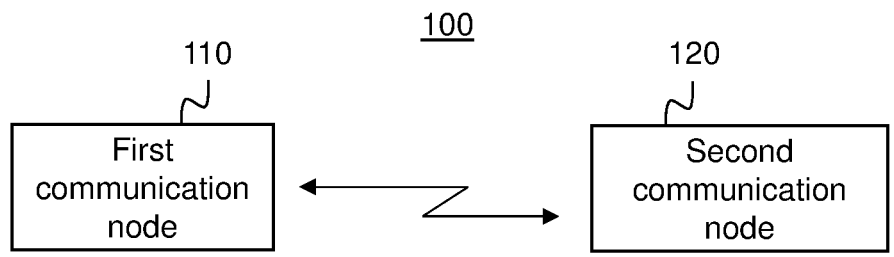
FIG. 1 is a schematic block diagram illustrating a wireless communication scenario in which the present invention may be used.
Figure 2:
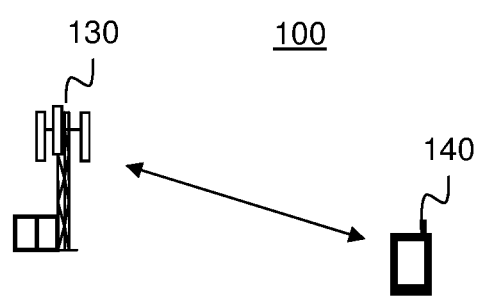
FIG. 2 is a schematic block diagram illustrating another wireless communication scenario in which the present invention may be used.

FIG. 1 shows a wireless communication network 100 comprising a first communication node 110 that is in, or is adapted for, wireless communication with a second communication node 120. The first communication node 110 and the second communication node 120 may be wireless communication devices that may be in peer-to-peer communication with each other, via any kind of wireless communication technology that may use different sub-carrier spacing. Alternatively, as shown in FIG. 2, the first communication node is a wireless access-providing network node 130, such as a base station, in the following called "a network node", and the second communication node is a wireless communication device 140, in the following called "a UE". It may also be the other way around, i.e. that the first communication node is a UE 140 and the second communication node is a network node 130.

"A UE" may be any type of wireless device capable of communicating with a network node or another UE using radio signals. For example, the UE may be a device to device (D2D) UE, a vehicle to vehicle (V2V) UE, a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

A "network node" may be any kind of network node that provides wireless access to a UE alone or in combination with another network node, such as a base station (BS), a radio base station, a base transceiver station, a base station controller, a network controller, a Node B (NB), an evolved Node B (eNB), a gNB, a NR BS, a Multi-cell/multicast Coordination Entity (MCE), a relay node, an access point, a radio access point, a Remote Radio Unit (RRU), a Remote Radio Head (RRH), a multi-standard BS (MSR BS), a core network node, e.g., Mobility Management Entity (MME), Self Optimizing Network (SON) node, a coordinating node, positioning node, Minimization of Drive Test (MDT) node, etc., or even an external node, e.g., 3rd party node, a node external to the current network, etc.

The term signal used herein may comprise one or more of a physical signal or a physical channel. The physical signal does not carry higher layer information, whereas physical channel carries higher layer information. Examples of physical signals are synchronization signal (SS), Primary SS (PSS), Secondary SS (SSS), Physical Broadcast Channel (PBCH), physical reference signals, Channel State Information Reference Signal (CSI-RS), reference signals for time and/or frequency tracking, e.g. tracking reference signal (TRS), phase and time tracking reference signal (PTRS), reference signals for UE positioning, Sounding Reference Signal (SRS), demodulation reference signal (DMRS) etc. Examples of physical channels are data channel, control channel, common channel, broadcast channel, multicast channel, Radio Access Channel (RACH), etc. Examples of downlink (DL) physical channels are Physical Downlink Shared Channel (PDSCH), Physical Downlink Control Channel (PDCCH), etc. Examples of uplink (UL) physical channels are Physical Uplink Shared Channel (PUSCH), Physical Uplink Control Channel (PUCCH), etc.

Figure 3:
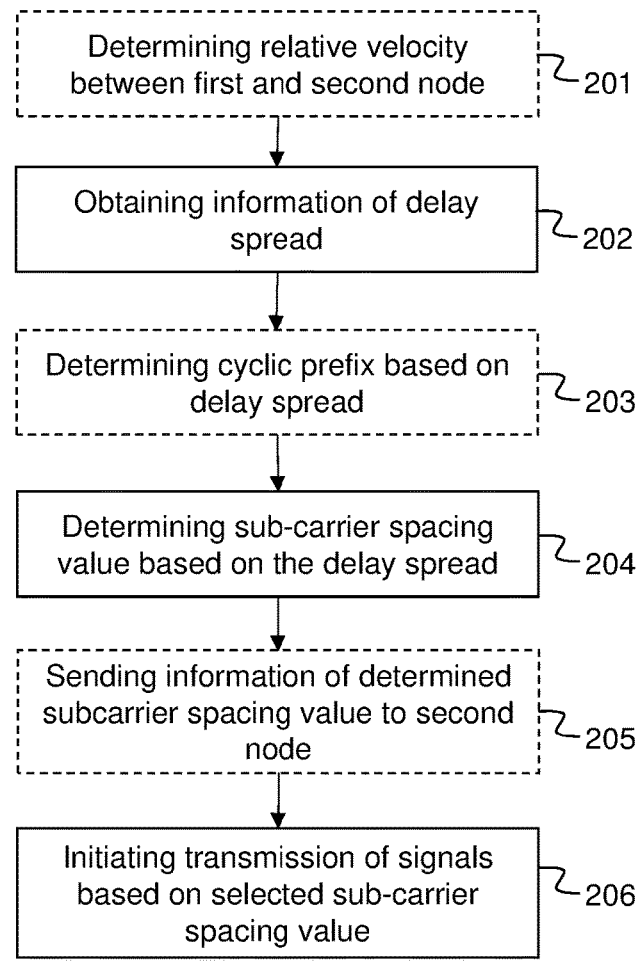
FIG. 3 is a flow chart illustrating a method performed by a first communication node, according to possible embodiments.

FIG. 3, in conjunction with FIG. 1, describes a method performed by a first communication node 110 for wireless communication with a second communication node 120. The method comprises obtaining 202 information of a delay spread of first signals sent between the first communication node 110 and the second communication node 120, and determining 204 at least one of a plurality of different values of a sub-carrier spacing for transmission of second signals between the first communication node 110 and the second communication node 120, based on the obtained information of the delay spread. The method further comprises initiating transmission 206 of the second signals between the first communication node 110 and the second communication node 120 based on the at least one determined value of sub-carrier spacing.

The determined value of sub-carrier spacing can be used for transmitting second signals in e.g. the next Transmission Time Interval, TTI. By the above method, the sub-carrier spacing can be optimized according to the obtained delay spread information. Hereby, transmission link capacity between the first and second communication node can be more efficiently used. When more than one values of the sub-carrier spacing is determined, the first communication node may select one of the determined more than one values to use for transmission based on a second parameter, such as signal quality, phase noise, channel bandwidth and transmit power of the first signal sent between the first and second communication node, and relative velocity of the first communication node compared to the second communication node. Further, it is possible to have a first value of sub-carrier spacing in one part of a bandwidth and second value of sub-carrier spacing in another art of the bandwidth within the same time resource.

According to a first embodiment, the first communication node is a base station and the second communication node is a UE. According to a second embodiment, the first communication node is a UE and the second communication node is a base station. According to a third embodiment, the first communication node is a UE and the second communication node is a UE as well. In other words, the third embodiment is peer-to-peer communication, i.e. D2D communication, such as V2V communication. "Delay spread" is a measure of the multipath richness of a wireless communications channel. In general, "delay spread" can be interpreted as a difference between time of arrival of the earliest significant multipath component, typically the line-of-sight component, and the time of arrival of the latest multipath component. That the first signals are sent between the first communication node and the second communication node is to cover that the signals on which delay spread is determined could be sent either from the first communication node to the second communication node, or vice versa, or in both directions. The information of the delay spread could be obtained by measuring delay spread of first signals received at the first communication node, and/or by receiving information of the delay spread from the second communication node, when the second communication node has measured delay spread of first signals it has received. The term "initiating transmission" may signify that the first communication node initiates transmission of signals from the first communication node towards the second communication node. Alternatively, "initiating transmission" may signify that the first communication node instructs or requests the second communication node to transmit second signals towards the first communication node. That the initiating of transmission of the second signals is based on the determined at least one value of the sub-carrier spacing may signify that second signals are transmitted using time-frequency resources with one of the at least one value of the determined sub-carrier spacing.

According to an embodiment, the plurality of different values of the sub-carrier spacing comprises a first value and a second value higher than the first value. Further, the determining 204 comprises comparing the delay spread to a threshold, and when the delay spread is above or equal to the threshold, selecting the first value, and when the delay spread is below the threshold, selecting the second value. When the first value is selected, transmission 206 is initiated based on the first value. Further, when the second value is selected, transmission 206 is initiated based on the second value. By setting such a threshold, the transmission link capacity can be more efficiently used. A threshold enables a rapid decision as to which sub-carrier spacing to apply for transmission of the second signals. The threshold can be adjusted to optimize throughput over the transmission link.

According to another embodiment, the method further comprises obtaining information of a first group of time-frequency resources for transmitting the second signals based on the first value and of a second group of time-frequency resources for transmitting the second signals based on the second value. Further, when the first value is selected, initiating transmission 206 of the second signals based on any of the time-frequency resources of the first group, and when the second value is selected, initiating transmission 206 of the second signals based on any of the time-frequency resources of the second group. The time-frequency resources of the first group have in common that when any of them are selected, they are configured to use the first value of the sub-carrier spacing for transmission of signals. Similarly, the time-frequency resources of the second group have in common that when any of them are selected, they are configured to use the second value of the sub-carrier spacing for transmission of signals. Hereby, the second communication node knows beforehand to scan for any sending in any of the time-frequency resources of the first group using the first value and to scan for any sending in any of the time-frequency resources of the second group using the second value. Consequently, the second communication node does not need to be informed separately of for which time-frequency resource which sub-carrier spacing was used. Further, when there are aspects of the first or second communication node that have to be adapted according to the selected value of the sub-carrier spacing, such as filtering, then the adaptation does not need to be done on a fast basis.

According to another embodiment, the information of the first group of time-frequency resources or of the second group of time-frequency resources is obtained based on one or more of a pre-defined rule and a configuration received from the second communication node 120 or any other communication node. The use of the first group of time-frequency resources and the second group of time-frequency resources with different numerologies leads to more flexibility e.g. different numerologies can be used.

According to another embodiment, the determining 204 is based on the information of the delay spread and on one or more of: signal quality, phase noise, channel bandwidth and transmit power of the first signal sent between the first and second communication node, and relative velocity of the first communication node compared to the second communication node. Signal quality may be determined as Signal to Interference and Noise Ratio, SINR, Signal to Noise Ratio, SNR, etc. The relative velocity signifies the velocity difference between the first communication node and the second communication node, in direction and amount. By taking account of not only delay spread but also any of signal quality, phase noise, channel bandwidth, transmission power and relative velocity, when determining sub-carrier spacing value, transmission link capacity between the first and second communication node can be even more efficiently used. According to an embodiment, a threshold of the delay spread may be combined with a second threshold for any of signal quality, phase noise, channel bandwidth, transmit power and relative velocity, so that different delay spread values may be determined depending on whether above or below the threshold of the delay spread and the second threshold.

According to an embodiment, the determining 204 is based on the delay spread as first priority, and the signal quality and/or the transmission power of the first signal as second priority. According to a variant of this embodiment, the determining 204 may as a third priority also be based on the relative velocity of the first communication node 110 compared to the second communication node 120. The priority can be pre-defined or configured by the network node. The use of priority allows the network node to control or adapt the autonomous determination of the subcarrier spacing by the UE.

According to another embodiment, the method further comprises determining 203 a cyclic prefix length based on the obtained information of the delay spread, and wherein the at least one of the plurality of different values of the sub-carrier spacing is determined 204 also based on the determined cyclic prefix length. The cyclic prefix length may be connected to the sub-carrier spacing, as can be seen in table 1. I.e. a certain sub-carrier spacing may have a corresponding cyclic prefix length. If the delay spread is within this cyclic prefix length then the second signal can be recovered. The cyclic prefix length may be determined based on the obtained delay spread information as well as on one or more of: signal quality, phase noise, channel bandwidth and transmit power of the first signal sent between the first and second communication node, and relative velocity of the first communication node compared to the second communication node. Further, the cyclic prefix length may be determined based on the delay spread as first priority, the signal quality and/or the transmission power of the first signal as second priority and optionally the relative velocity of the first communication node 110 compared to the second communication node 120 as third priority.

According to another embodiment, the method further comprises sending 205 to the second communication node, information of the determined at least one value of the sub-carrier spacing for transmission of second signals between the first communication node and the second communication node. By sending information of the determined value of the subcarrier spacing to the second communication node, the second communication node would know which subcarrier spacing that was used and therefore knows at which time-frequency resources to check for received second signals, or in case the second communication node is a UE that is to be transmitting the second signals, the first communication node informs the second communication node which time-frequency resources that the second communication node is to use for sending the second signals.

According to another embodiment, the method further comprises determining 201 relative velocity between the first communication node 110 and the second communication node 120. Further, the obtaining 202 of information of a delay spread and the determining 204 of at least one value of the sub-carrier spacing is performed more frequently for a first relative velocity than for a second relative velocity whose magnitude is lower than a magnitude of the first relative velocity.

Figure 4:
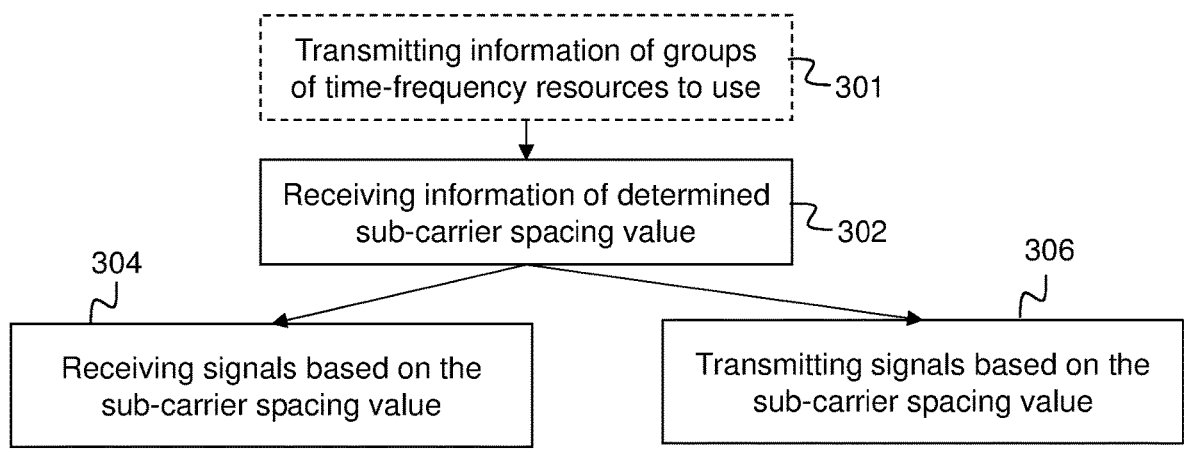
FIG. 4 is a flow chart illustrating a method performed by a second communication node, according to possible embodiments

FIG. 4, in conjunction with FIG. 2, describes a method performed by a second communication node 120 for wireless communication with a first communication node 110. The method comprises receiving 302, from the first communication node 110, information of a value of sub-carrier spacing determined based on a delay spread of first signals sent between the first communication node 110 and the second communication node 120. The method then further comprises either receiving 304, from the first communication node 110, second signals based on the value of the sub-carrier spacing, or transmitting 306, to the first communication node 110, second signals based on the value of the sub-carrier spacing. In other words, the second communication node is informed by the first communication node, of a value of the sub-carrier spacing that is to be used for communication of second signals. The second communication node then uses this information when it either receives second signals from the first communication node, or when it sends second signals to the first communication node. Hereby, the best sub-carrier spacing value can be used for transmission for optimizing usage of the transmission link capacity.

According to an embodiment, the method further comprises transmitting 301, to the first communication node 110, information of a first group of time-frequency resources to be used by the first communication node 110 for initiating transmission of second signals using a first value of sub-carrier spacing, and information of a second group of time-frequency resources to be used by the first communication node 110 for initiating transmission of second signals using a second value of sub-carrier spacing. Hereby, the second communication node can instruct the first communication node which time-frequency resources to use depending on the determined value of sub-carrier spacing. The second value of subcarrier spacing may be higher than the first value of sub-carrier spacing.

According to an embodiment, a first value of sub-carrier spacing is used when the second signals are received 304 from the first communication node 110 or transmitted 306 to the first communication node on any of time-frequency resources of a first group, and a second value of sub-carrier spacing is used when the second signals are received 304 from the first communication node 110 or transmitted 306 to the first communication node on any of time-frequency resources of a second group.

In the following embodiments, the delay spread is typically expressed in terms of maximum delay within which the receiving communication node receives all signals, transmitted by the transmitting node, which are not less than X dB below the strongest signal path of the received signal. Typical example of X is 3 dB. The delay spread is obtained by the first node or the second node for the radio channel used for transmitting signals between the first communication node and the second communication node. In one example the first communication node estimates or measures or determines the delay spread of a radio signal, or alternatively measures the different delay spread of multiple radio signals, received by the first communication node from the second communication node. In another example the first communication node receives information from the second communication node about the delay spread of radio signals. In this case, the second communication node estimates or measures or determines the delay spread of signals received by the second communication node from the first communication node. In yet another example the first communication node combines the results of the estimated delay spread as well as the second communication node reported results about the second communication node estimated delay spread to determine a combined value of the delay spread by a function. Examples of functions are average, minimum, maximum, weighted average etc. The delay spread can be determined periodically or based on a condition or event or an operation. Examples of conditions or events are: whenever the first communication node wants to change the numerology, before scheduling a second communication node, whenever signal quality experienced by the second communication node and/or the first communication node changed by certain margin or threshold.

The embodiments assume that the network node is capable of using at least two different numerologies, NUM1 and NUM2, corresponding to two different sub-carrier spacing, SCS, values respectively. The mapping between a set of SCS values and delay spread can be pre-defined or the second communication node can be configured with the mapping table by the first communication node. In one example, the same numerologies are employed by the first communication node for scheduling the second communication node in both communication directions i.e. NUM1 and NUM2 are the same both for communication from the first communication node towards the second communication node and for communication from the second communication node towards the first communication node. In another exemplary implementation, different numerologies are used by the first communication node for scheduling the second communication node in both communication directions e.g. NUM1u and NUM2u are used in one direction, while NUM1d and NUM2d are used in the opposite direction. The embodiments are applicable for all these different exemplary implementations. For simplicity the generic abbreviations, NUM1 and NUM2, used hereinafter denote any two different numerologies which can be the same or different in one direction as in the opposite direction.

The invention comprises of several embodiments which are elaborated below. In embodiments of the invention, channel delay spread is used by the first communication node for determining or selecting one or more SCS values, out of a plurality of SCS values, to be used for communication between the first communication node and the second communication node.

According to a first embodiment, the first communication node is a network node and the second communication node is a UE. In this embodiment, the network node determines one or more appropriate SCS value out of a plurality of SCS values, based upon a comparison between a channel delay spread, Ds, of the channel and a delay spread threshold, Dt, and assigns the UE with the determined SCS value as one of the input parameters to the scheduler of the network node.

According to one aspect of the first embodiment, the SCS value may be determined based on a comparison between Ds and Dt as expressed below:

if the magnitude of Ds is less than Dt, then a SCS value above a certain SCS threshold, St, is selected for scheduling the UE, if the magnitude of Ds is equal to or larger than Dt, then a SCS value less than or equal to St is selected for scheduling the UE.

According to another aspect of the first embodiment, more than one delay spread threshold, e.g. two delay spread thresholds are used by the network node for selecting one of the plurality of SCS values. This may be of special interest when there are more than two SCS values available for scheduling the UE. This is explained with the following example:

if the magnitude of Ds is less than a first delay spread threshold, Dt1, i.e. |Ds|<Dt1, then a SCS value above a first SCS threshold, St1, i.e. SCS>St1, is selected for scheduling the UE, if the magnitude of Ds is between Dt1 and a second delay spread threshold, Dt2, i.e. Dt1≤|Ds|<Dt2, then a SCS value between St1 and a second subcarrier spacing threshold, St2, i.e. St2<SCS≤St1, is selected for scheduling the UE, if the magnitude of Ds is equal to or larger than Dt2, i.e. |Ds|≥Dt2, then a SCS value less than or equal to St2, i.e. SCS≤St2, is selected for scheduling the UE.

In the above example Dt1<Dt2, and St1>St2.

According to another aspect of the first embodiment, the network node schedules the UE to transmit signals in the UL, but the SCS value used for transmission in the UL is autonomously determined by the UE based on the delay spread of the channel. The UE may determine the UL SCS value based on a rule, which can be pre-defined or the UE can be configured with the rule by the network node. For example, a rule can define an association or mapping between a delay spread and an SCS value. Examples of such rules are shown in table 2 and table 3. The UE selects the SCS value based on the determined delay spread, by comparing them according to their association, according to for example table 2 or table 3.

TABLE 2

Mapping table defining association between delay spread
and SCS value for UL transmission assuming one
threshold for Ds and SCS, respectively: Dt1 and St1.

| Case | Ds range | UL SCS |
| --- | --- | --- |
| 0 | Ds < Dt1 | SCS > St1 |
| 1 | Ds ≥ Dt1 | SCS ≥ St1 |

TABLE 3

Mapping table defining association between delay spread
and SCS value for UL transmission assuming multiple
thresholds for Ds and SCS respectively.

| Case | Ds range | UL SCS |
| --- | --- | --- |
| 0 | Ds < Dt1 | SCS > St1 |
| 1 | Dt1 ≤ Ds < Dt2 | St1 ≤ SCS < St2 |
| 2 | Ds ≥ Dt2 | SCS ≤ St1 |

The SCS and cyclic prefix, CP, length of the symbol are related to each other as shown in table 1. Therefore, in another example of a rule for determining SCS value, a mapping can be defined between delay spread and CP length. The UE first determines the CP length based on the delay spread and thereafter selects the SCS which corresponds to the determined CP length, e.g. based on table 1.

The UE can determine the delay spread based on signals transmitted and/or received by the UE during previous time resources, e.g. average value of delay spread over the last X number of slots. The parameter X can be pre-defined, configured by the network node or autonomously determined by the UE. For example, in an indoor or urban environment, or when UE speed is above a speed threshold, the UE estimates delay spread over shorter time and more frequently since in such situations the delay spread of the channel can change more quickly. But in rural environment, or if UE speed is below or equal to the speed threshold, then the UE estimates the delay spread less often and over longer time.

The UE then transmits the UL signal, in e.g. a PUSCH, using the determined or selected SCS value based e.g. on the rule, as explained above with examples. After determining the UL SCS value according to one aspect of UL transmission, the UE can transmit using the determined SCS value only in the UL time-frequency resource, e.g. symbol, slot, where the network node has scheduled the UE. In this case the UL time-frequency resource allows the UE to transmit using any of the determined UL SCS value. According to another aspect of UL transmission, the UE can transmit using the determined SCS value only in the UL time-frequency resource, e.g. symbol, slot, where the UL transmission is allowed with the determined SCS value. For example, assuming two possible SCS values, e.g. 15 KHz and 30 KHz, certain UL time resources, e.g. slot with odd number, can be configured for UL transmission using 15 KHz, while the remaining UL time resources, e.g. slots with even number, can be configured for UL transmission using 30 KHz. The association between UL time resources and UL SCS value can be pre-defined or configured by the network node. As an example, the network node may schedule the UE with one UL resource of odd slot number and also one UL resource of even slot number. Then, based on the determined SCS value, the UE will actually transmit the UL signal in either the even slot or in the odd slot.

The network node determines whether the SCS needs to be changed or updated based on determined delay spread for the UE, periodically or at specific occasions or under certain conditions. Examples of specific occasions or certain conditions are: before scheduling the UE, whenever the delay spread changes by a certain margin with respect to a previous value or a reference value, upon receiving a request from the UE, whenever signal quality experienced by the UE and/or the network node falls below a certain threshold, etc.

The network node then assigns or configures the UE with the determined SCS value, which in turn is used by the UE for operating signals. The network node may configure the UE with the SCS value by one or more of the following means:
  by transmitting a message in a layer-1 signaling, e.g. an identifier of one of the pre-defined SCS values,
  by transmitting a message in a Media Access Control, MAC, signaling, e.g. by sending a MAC command containing an identifier of one of the pre-defined SCS values,
  by transmitting a message in a higher layer signaling, e.g. by sending a Remote Ratio Control, RRC, message, which contains an identifier of one of the pre-defined SCS values.

The determined SCS value is also used as input to the scheduler for scheduling the UE for operating signals in UL and/or DL. The network node, e.g. the scheduler in the network node, may further assign time-frequency resources, e.g. a scheduling grant, to the UE for operating signals. Examples of time-frequency resources are physical channels e.g. frequency channels, physical or virtual resource blocks, resource elements etc. The term operating signals by the UE herein means transmitting signals in UL to the network node and/or receiving signals in DL from the network node. One example is to use the Dt to determine an acceptable SINR level and corresponding throughput level to determine the appropriate SCS value.

Figure 5:
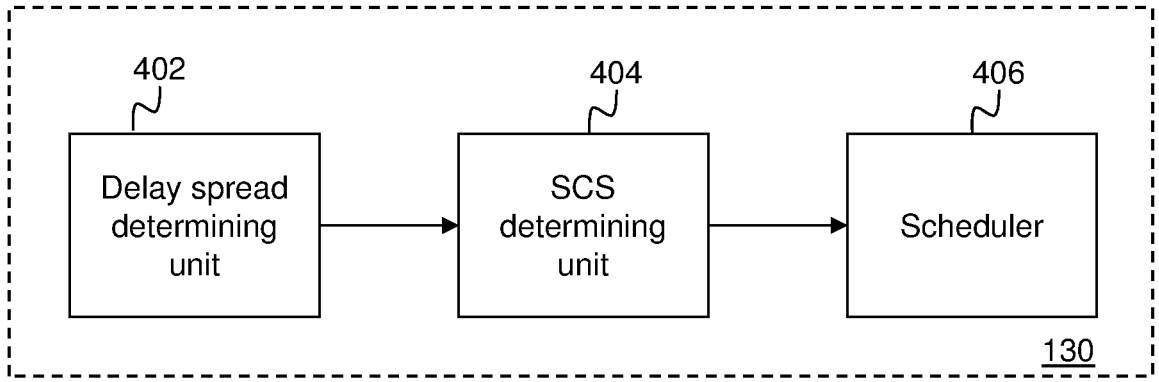
FIG. 5 is a block diagram illustrating a network node in more detail, according to possible embodiments.
Figure 6:
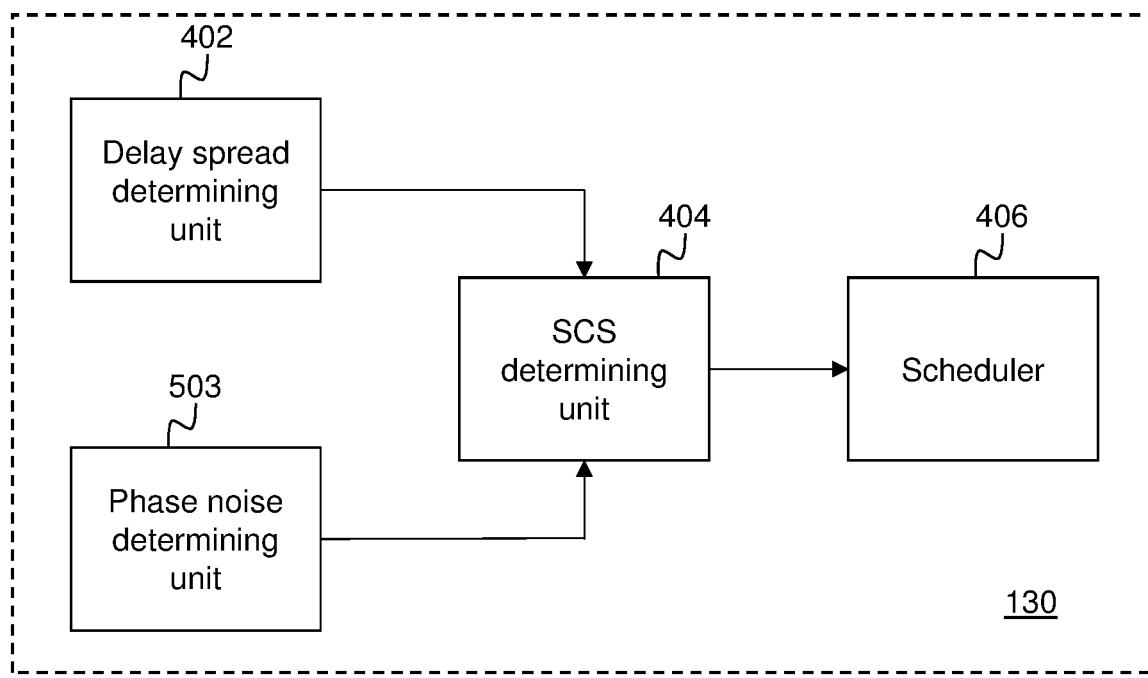
FIG. 6 is a block diagram illustrating a network node in more detail, according to further possible embodiments

FIG. 5 shows an embodiment of a network node 130. The network node 130 comprises a delay spread determining unit 402, a SCS determining unit 404 and a scheduler 406. The network node 130 is arranged to detect a UE within a cell. For first signals sent between this UE and the network node, the delay spread determining unit 402 determines the channel delay spread. The SCS determining unit 404 then determines which SCS value to use. The decision of which SCS value that should be used depends upon the number of SCS values available for the UE. Any of the outlined examples above may be used to determine the appropriate SCS value to be used. After determining the SCS value, the scheduler 406 uses the determined SCS value for scheduling the transmission of second signals. In case transmission is to be in UL, the network node 130 instructs the UE 140 regarding in which time-frequency resources to transmit the second signals, according to the scheduling.

According to a second embodiment, the network node 130 uses the channel delay spread and also an additional secondary parameter to determine the SCS value. The UE is then configured with the determined SCS value as described in the first embodiment. The network node also assigns resources for scheduling the UE as described in the first embodiment. The network node may also determine the SCS based on delay spread and the secondary parameter periodically or on conditional basis as described in the first embodiment.

An example of a secondary parameter that can be considered by the network node is phase noise impact. The impact of the phase noise may be determined by determining SINR. At low SINR, phase noise can be tolerated whereas at high SINR, phase noise may limit performance. Phase noise in the radio frequency, RF, domain is caused due to imperfections in the frequency oscillator and/or in phase-locked loops. Phase noise is the frequency stability of a signal, and long-term stability of an oscillator over the observation time. A realistic signal can be given by $\sin(\omega(t)+\phi(t))$ where $\phi(t)$ is the random phase changes which would add to the ideal signal $\sin(\omega(t))$. Phase noise degrades orthogonality between subcarriers. The phase noise spectrum decays with frequency and thus a high SCS value experience lower phase noise and improved orthogonality compared to an SCS value that is lower than the high SCS value. Phase noise, and consequently SINR, is an important parameter but secondary to the Ds parameter. Phase noise, e.g. SINR, may be a critical component to determine the SCS value at higher frequencies, such as for mm wavelengths.

FIG. 5 shows the network node 130 as in FIG. 4, but added with a phase noise determining unit 503. The phase noise impact determining unit 503 is arranged to determine the impact of the phase noise of the first signals, for example by determining SINR. The SCS determining unit 404 then takes both the delay spread and the phase noise impact into consideration when determining the SCS value to use for transmitting the second signals.

In one aspect of the implementation, SINR is explicitly determined by the network node based on the measurements performed on signals received from the UE. Alternatively, SINR can be determined based on a pre-defined model as a function of the frequency of the received signal. As an example of this aspect, if the magnitude of the Ds is less than Dt and also SINR, SINRn, is below a SINR threshold, SINRt, then an SCS above an SCS threshold, St, is selected for scheduling the UE. More specifically: if the magnitude of the Ds<Dt and SINRn<SINRt, then an SCS value above St is selected for scheduling the UE, otherwise an SCS value below St is selected for scheduling the UE.

In another example, phase noise impact is implicitly determined by determining signal quality, e.g. SINR, SNR etc. If the signal quality, Q, falls below certain signal quality threshold, Qt, then the phase noise is assumed to need to be limited to be below a certain threshold. The Qt depends on conditions related to the received signal level, received interference due to transmitted signals, radio channel, carrier frequency etc. The tolerable level of phase noise can therefore be determined by mapping between phase noise spectrum and the estimated SINR in order to determine the best subcarrier spacing for a certain frequency. In this case the determining of SCS value may be performed according to the following: if the magnitude of Ds<Dt and Q<Qt then a SCS value larger than St is selected by the network node for scheduling the UE; otherwise a SCS value smaller than St is selected.

According to a third embodiment, the network node uses the channel delay spread as well as one or more additional parameters such as channel bandwidth, UE speed in relation to the position of the network node, e.g. Doppler frequency, transmit power etc, for determining the SCS value for scheduling the UE. The use of these additional parameters for determining the SCS value is explained with several examples below.

For situations where a larger bandwidth is desired for scheduling the UE, a larger SCS value, e.g. SCS above a SCS threshold, is selected by the network node for scheduling the UE, unless the delay spread is larger than a certain delay spread threshold. According to another embodiment, the type of service which the UE is requiring may be such an additional, secondary, input parameter for determining the SCS value to be used. The URLLC service is a type of service that requires high reliability, and therefore the usage or non-usage of URLLC may have influence on the SCS value to be used. The final design of the URLLC is however not yet determined. In case there is any flexibility to adjust SCS also for URLLC, then for the UE using URLLC and is operating in a channel with large delay spread, i.e. Ds>Dt, the UE is scheduled with a lower SCS value to ensure good quality of service.

In case semi-static allocation of SCS value is used, the network node may allocate SCS value to UEs dependent on long-term duration link conditions. Examples of mutually short-term and long-term durations are 1 or 2 subframes, and 10 or more frames, respectively. The same criteria as for the above, e.g. delay spread and SINR could be used, but long-term estimates would be used when the SCS value assignment would be performed by the scheduler, for DL and/or for UL transmissions. If a UE would be semi-statically allocated a SCS value, then as a form of load balancing, the proportion of the carrier, i.e. number of time-frequency resources, assigned to each numerology could be adjusted; i.e. as one SCS becomes increasing in demand in the cell, the network node can adjust the composition of the bandwidth between two numerologies, i.e. X % of NUM1 and Y % NUM2 where X %+Y %=100%, to suit the need of the network. The network node informs the UE that it intends to change the numerology from time resource N in time (N−m) when the numerology will change for those UEs which will be affected by the shift in numerology as the network node Radio Resource Manager, RRM, sees a demand for one numerology over the other.

To summarize, in cases in which the numerology is not linked to the type of service being supported and can instead be selected to maximize link performance, the scheduler of the network node or the network node's RRM can use these parameters as inputs to scheduling the UEs within the cell. The parameters may have different priorities, so that they influence the determination of SCS value in a falling scale, according to the priority. According to an embodiment, the parameters may be ranked from highest priority to lowest priority according to the following:

1. Delay spread experienced by the UE
2. Transmission quality, e.g. SINR, or transmission power
3. Other factors such as UE speed in relation to the position of the network node.

Long term statistics can also be used to determine how NUM1 and NUM2 should be divided within the network. The delay spread measurement should be used over some length of slots or frames before the decision to change SCS is made in the network node, to avoid changing X % of NUM1 and Y % of NUM2 too frequently.

Figure 7:
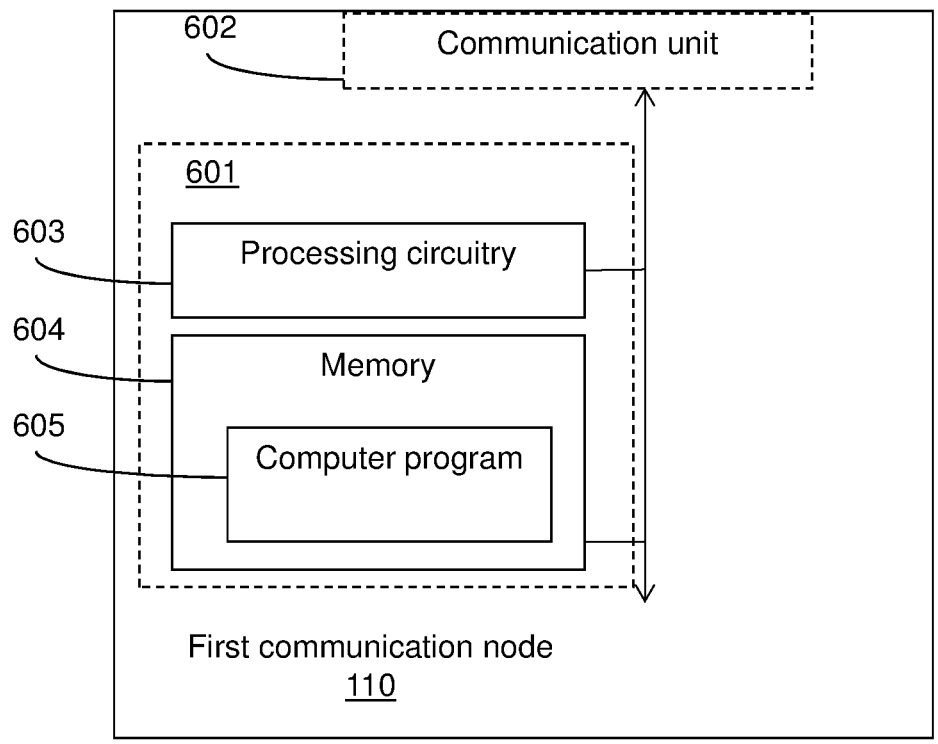
FIGS. 7-8 are block diagrams illustrating a first communication node in more detail, according to further possible embodiments.

FIG. 7, in conjunction with FIG. 1, describes a first communication node 110 operable in a wireless communication system 100, for wireless communication with a second communication node 120. The first communication node 110 comprises processing circuitry 603 and a memory node 604. The memory contains instructions executable by said processing circuitry, whereby the first communication node 110 is operative for obtaining information of a delay spread of first signals sent between the first communication node 110 and the second communication node 120, and determining at least one of a plurality of different values of a sub-carrier spacing for transmission of second signals between the first communication node 110 and the second communication node 120, based on the obtained information of the delay spread. Further, the first communication node 110 is operative for initiating transmission of the second signals between the first communication node 110 and the second communication node 120 based on the determined at least one value of the sub-carrier spacing.

According to an embodiment, the plurality of different values of the sub-carrier spacing comprises a first value and a second value higher than the first value. Further, the first communication node is operative for determining the at least one of a plurality of different values by comparing the delay spread to a threshold, and when the delay spread is equal to or above the threshold, selecting the first value, and when the delay spread is below the threshold, selecting the second value.

According to another embodiment, the first communication node is further operative for obtaining information of a first group of time-frequency resources for transmitting the second signals based on the first value and of a second group of time-frequency resources for transmitting the second signals based on the second value. Further, when the first value is selected, the first communication node is operative for initiating the transmission of the second signals based on any of the time-frequency resources of the first group, and when the second value is selected, the first communication node is operative for initiating the transmission of the second signals based on any of the time-frequency resources of the second group.

According to another embodiment, the first communication node is operative for determining the at least one of a plurality of different values also based on one or more of: signal quality, phase noise, channel bandwidth and transmit power of the first signal sent between the first and second communication node, and relative velocity of the first communication node compared to the second communication node.

According to another embodiment, the first communication node is operative for determining the at least one of a plurality of different values based on the delay spread as first priority, and the signal quality and/or the transmission power of the first signal as second priority.

According to another embodiment, the first communication node is further operative for determining a cyclic prefix length based on the obtained information of the delay spread, and wherein the determining of the at least one of the plurality of different values of the sub-carrier spacing is also based on the determined cyclic prefix length.

According to another embodiment, the first communication node is further operative for sending to the second communication node, information of the determined at least one value of the sub-carrier spacing for transmission of second signals between the first communication node and the second communication node.

According to other embodiments, the first communication node 110 may further comprise a communication unit 602, which may be considered to comprise conventional means for wireless communication with a second communication node 120, such as a wireless transceiver. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the first communication node 110 to perform the steps described in any of the described embodiments of the first communication node 110. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the wireless communication network 100 to which the first communication node 110 has access via the communication unit 602. The computer program 605 may then be downloaded from the server into the memory 604.

Figure 8:
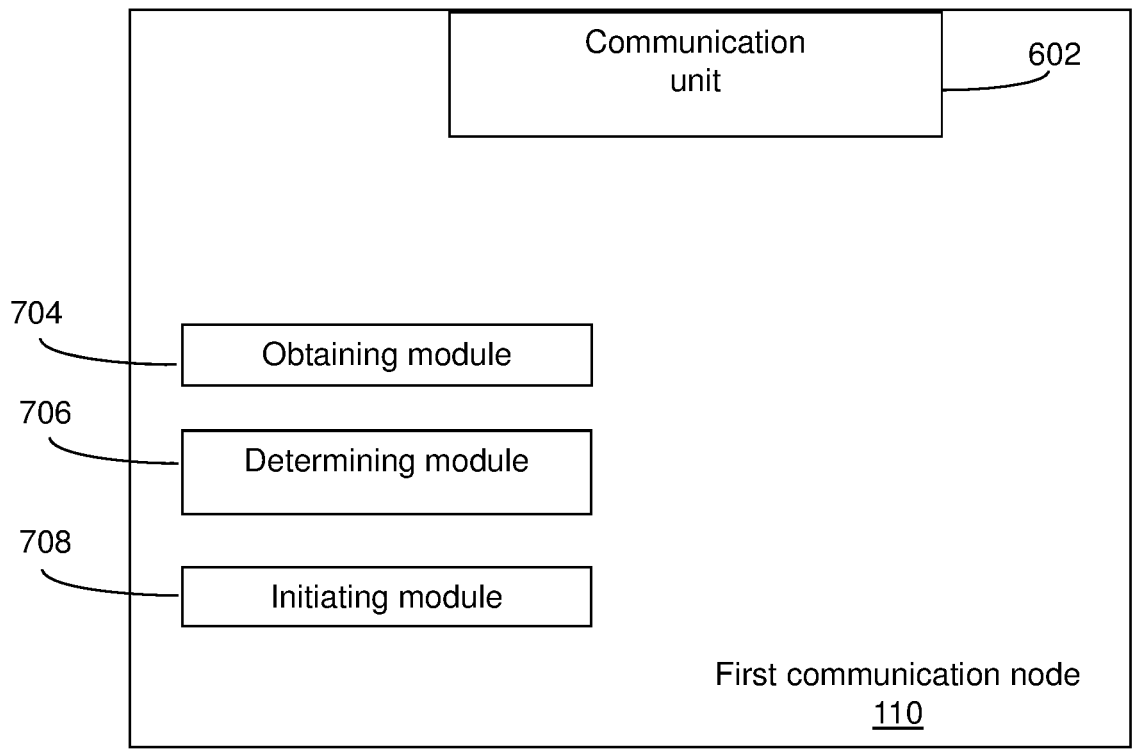

FIG. 8, in conjunction with FIG. 1, describes another embodiment of a first communication node 110 operable in a wireless communication system 100, for wireless communication with a second communication node 120. The first communication node 110 comprises an obtaining module 704 for obtaining information of a delay spread of first signals sent between the first communication node 110 and the second communication node 120, and a determining module 706 for determining at least one of a plurality of different values of a sub-carrier spacing for transmission of second signals between the first communication node 110 and the second communication node 120, based on the obtained information of the delay spread. The first communication node 110 further comprises an initiating module 708 for initiating transmission of the second signals between the first communication node 110 and the second communication node 120 based on the determined at least one value of the sub-carrier spacing. The first communication node 110 may further comprise a communication unit 602 similar to the communication unit described in FIG. 7. In an embodiment, the modules are implemented as a computer program running on a processing circuitry, such as the processing circuitry shown in FIG. 7.

Figure 9:
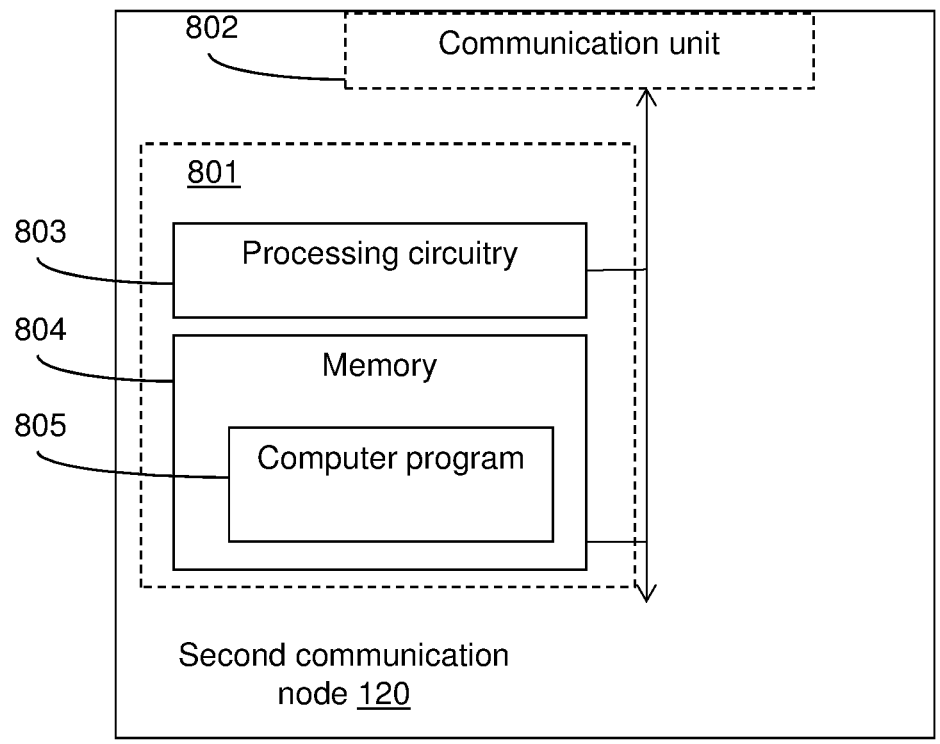
FIGS. 9-10 are block diagrams illustrating a first communication node in more detail, according to further possible embodiments.

FIG. 9, in conjunction with FIG. 1, describes a second communication node 120 operable in a wireless communication system 100, for wireless communication with a first communication node 110. The second communication node 120 comprises a processing circuitry 803 and a memory 804. The memory contains instructions executable by said processing circuitry, whereby the second communication node 120 is operative for receiving, from the first communication node 110, information of a value of sub-carrier spacing determined based on a delay spread of first signals sent between the first communication node 110 and the second communication node 120, and receiving, from the first communication node 110, second signals based on the value of the sub-carrier spacing, or transmitting, to the first communication node 110, second signals based on the value of the sub-carrier spacing.

According to an embodiment, the second communication node is further operative for transmitting, to the first communication node 110, information of a first group of time-frequency resources to be used by the first communication node 110 for initiating transmission of second signals using a first value of sub-carrier spacing, and information of a second group of time-frequency resources to be used by the first communication node 110 for initiating transmission of second signals using a second value of sub-carrier spacing.

According to another embodiment, the second communication node is further operative for, when the second signals are received from the first communication node 110 or transmitted to the first communication node on any of time-frequency resources of a first group, using a first value of sub-carrier spacing, and when the second signals are received from the first communication node 110 or transmitted to the first communication node on any of time-frequency resources of a second group, using a second value of sub-carrier spacing.

According to other embodiments, the second communication node 120 may further comprise a communication unit 802, which may be considered to comprise conventional means for wireless communication with a first communication node 110, such as a wireless transceiver. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the second communication node 120 to perform the steps described in any of the described embodiments of the second communication node 110. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity connected to the wireless communication network 100 to which the second communication node 120 has access via its communication unit 802. The computer program 805 may then be downloaded from the server into the memory 804.

Figure 10:
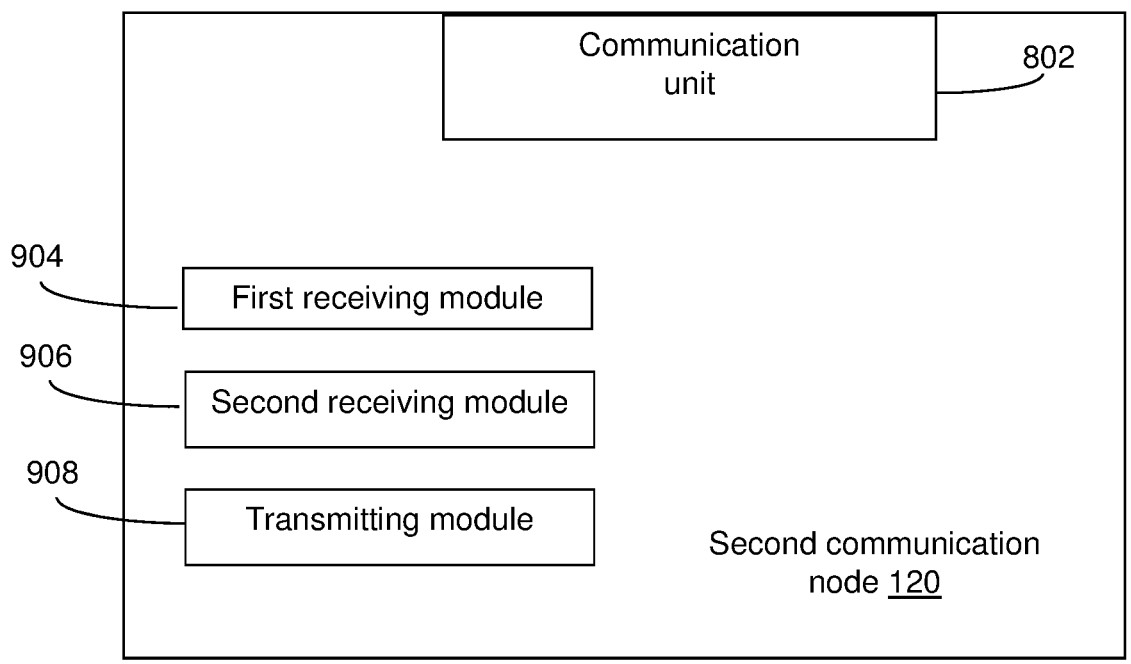

FIG. 10, in conjunction with FIG. 1, describes another embodiment of a second communication node 120 operable in a wireless communication system 100 for wireless communication with a first communication node 110. The second communication node 120 comprises a first receiving module 904 for receiving, from the first communication node 110, information of a value of sub-carrier spacing determined based on a delay spread of first signals sent between the first communication node 110 and the second communication node 120. The second communication node 120 further comprises a second receiving module 906 for receiving, from the first communication node 110, second signals based on the value of the sub-carrier spacing, or a transmitting module 908 for transmitting, to the first communication node 110, second signals based on the value of the sub-carrier spacing. The second communication node 120 may further comprise a communication unit 802 similar to the communication unit described in FIG. 9. In an embodiment, the modules of FIG. 10 are implemented as a computer program running on a processing circuitry, such as the processing circuitry shown in FIG. 9.

At least some of the above embodiments may provide any of the following advantages: The UE could report in the UL the delay spread in which the corresponding SCS could be used to schedule transmission in the next TTI. The embodiments provide efficient scheduling considering delay spread, phase noise, channel bandwidth, and other parameters so that link level performance is optimized, or at least improved. The network node is enabled to adapt or optimize SCS when power spectral density between two or more numerologies can differ, for example in a situation where a UE transmission power is high, e.g. at a cell edge, an adjustment can be made of SCS or power spectral density between the two numerologies.

Figure 11:
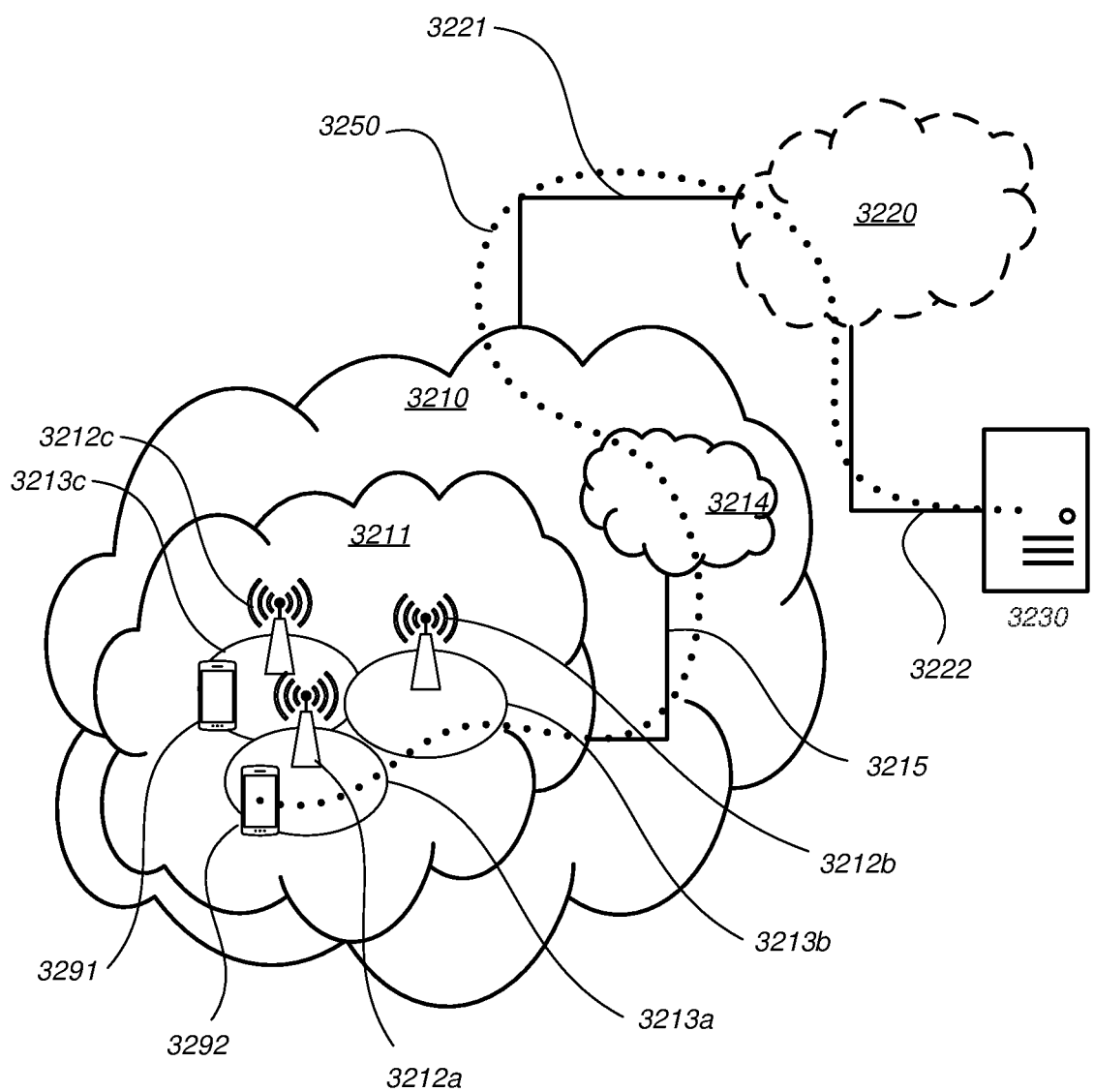
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. The base station 3212 may be the first communication node 110 of FIG. 1 and the UE 3291 may be the second communication node 120 of FIG. 1.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
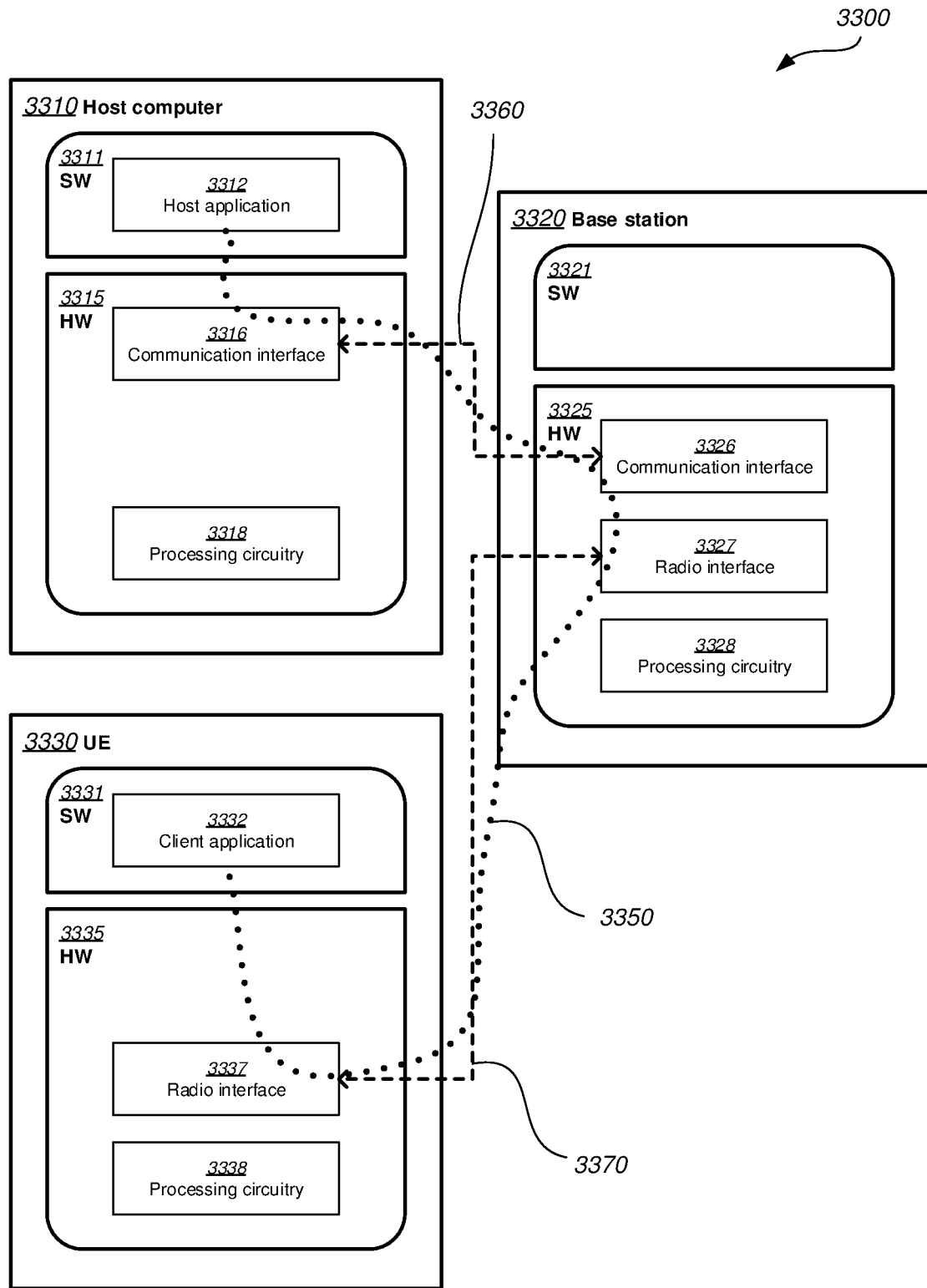
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the radio-related embodiments described throughout this disclosure. One or more of the various embodiments improve the performance of OTT services provided to the UE 3330 using the OTT connection 3350, in which the wireless connection 3370 forms the last segment. More precisely, as the embodiments of this invention may improve transmission link capacity in both uplink and downlink, the teachings of these embodiments may improve data rate and/or latency for the UE and thereby provide benefits such as reduced user waiting time, better responsiveness and reduced user waiting time.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
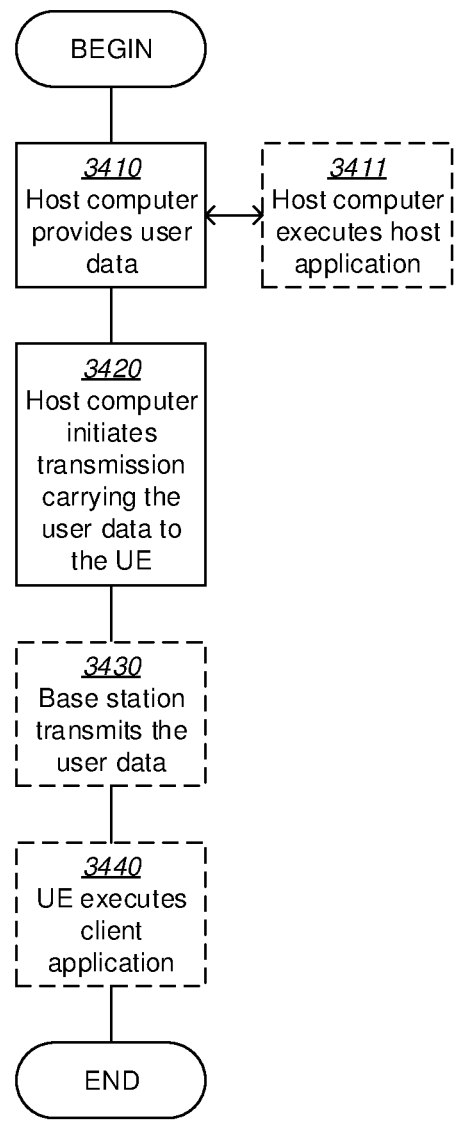
FIGS. 13-16 are flowcharts illustrating methods implemented in a communication system including a host computer, a base station and a user equipment

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 14:
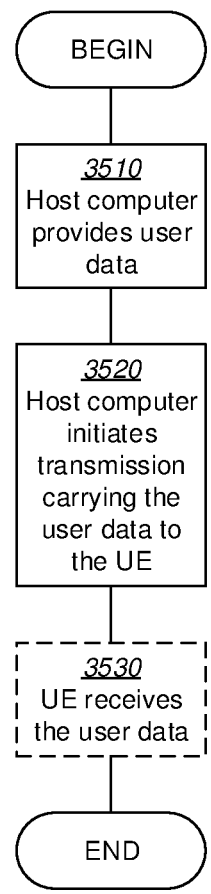

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 15:
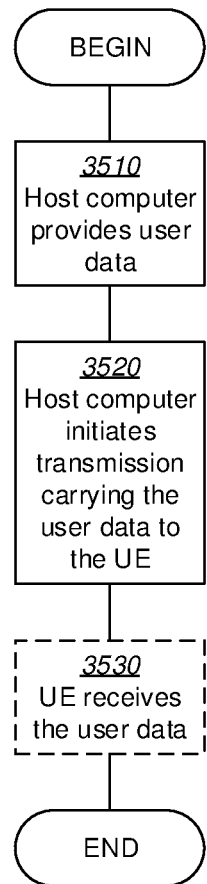

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 16:
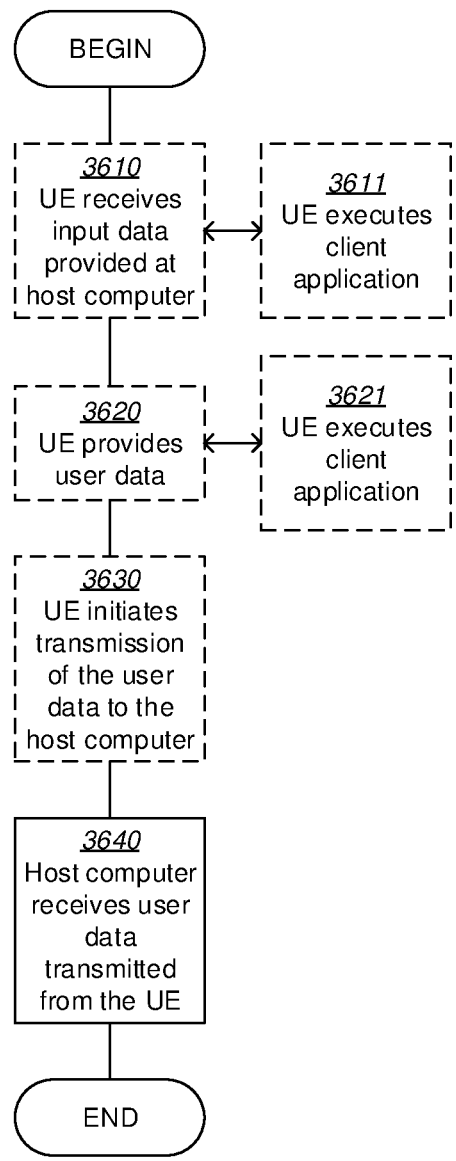

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

EMBODIMENTS

In the embodiments below, according to a first embodiment, the first communication node mentioned is a base station and the second communication node is a UE. Further, according to a second embodiment, the first communication node is a UE and the second communication node is a base station.

5. A communication system including a host computer comprising:
processing circuitry configured to provide user data; and
a communication interface configured to forward the user data to a cellular network for transmission to a second communication node,
wherein the cellular network comprises a first communication node having a radio interface and processing circuitry, the first communication node's processing circuitry configured for
obtaining information of a delay spread of first signals sent between the first communication node (110) and the second communication node (120);
determining at least one of a plurality of different values of a sub-carrier spacing for transmission of second signals between the first communication node (110) and the second communication node (120), based on the obtained information of the delay spread, and
initiating transmission of the second signals between the first communication node (110) and the second communication node (120) based on the determined at least one value of the sub-carrier spacing.

6. The communication system of embodiment 5, further including the first communication node.

7. The communication system of embodiment 6, further including the second communication node, wherein the second communication node is configured to communicate with the first communication node.

8. The communication system of embodiment 7, wherein: the processing circuitry of the host computer is configured to execute a host application, thereby providing the user data; and the second communication node comprises processing circuitry configured to execute a client application associated with the host application.

15. A method implemented in a communication system including a host computer, a first communication node and a second communication node, the method comprising:
at the host computer, providing user data; and
at the host computer, initiating a transmission carrying the user data to the second communication node via a cellular network comprising the first communication node, wherein the first communication node is:
obtaining information of a delay spread of first signals sent between the first communication node (110) and the second communication node (120);
determining at least one of a plurality of different values of a sub-carrier spacing for transmission of second signals between the first communication node (110) and the second communication node (120), based on the obtained information of the delay spread, and
initiating transmission of the second signals between the first communication node (110) and the second communication node (120) based on the determined at least one value of the sub-carrier spacing.

16. The method of embodiment 15, further comprising:
at the first communication node, transmitting the user data.

17. The method of embodiment 16, wherein the user data is provided at the host computer by executing a host application, the method further comprising at the second communication node, executing a client application associated with the host application.

25. A communication system including a host computer comprising:
processing circuitry configured to provide user data; and
a communication interface configured to forward user data to a cellular network for transmission to a second communication node, wherein the second communication node comprises a radio interface and processing circuitry, the second communication node's processing circuitry configured for:
receiving, from the first communication node (110), information of a value of sub-carrier spacing determined based on a delay spread of first signals sent between the first communication node (110) and the second communication node (120), and
receiving, from the first communication node (110), second signals based on the value of the sub-carrier spacing, or transmitting (306), to the first communication node (110), second signals based on the value of the sub-carrier spacing.

26. The communication system of embodiment 25, further including the second communication node.

27. The communication system of embodiment 26, wherein the cellular network further includes a first communication node configured to communicate with the second communication node.

28. The communication system of embodiment 26 or 27, wherein the processing circuitry of the host computer is configured to execute a host application, thereby providing the user data; and the second communication node's processing circuitry is configured to execute a client application associated with the host application.

35. A method implemented in a communication system including a host computer, a first communication node and a second communication node, the method comprising: at the host computer, providing user data; and at the host computer, initiating a transmission carrying the user data to the second communication node via a cellular network comprising the first communication node, wherein the second communication node is
receiving, from the first communication node (110), information of a value of sub-carrier spacing determined based on a delay spread of first signals sent between the first communication node (110) and the second communication node (120), and
receiving, from the first communication node (110), second signals based on the value of the sub-carrier spacing, or transmitting (306), to the first communication node (110), second signals based on the value of the sub-carrier spacing.

36. The method of embodiment 35, further comprising: at the second communication node, receiving the user data from the first communication node.

45. A communication system including a host computer comprising:
a communication interface configured to receive user data originating from a transmission from a second communication node to a first communication node, wherein the second communication node comprises a radio interface and processing circuitry, the second communication node's processing circuitry configured for:
receiving, from the first communication node (110), information of a value of sub-carrier spacing determined based on a delay spread of first signals sent between the first communication node (110) and the second communication node (120), and
receiving, from the first communication node (110), second signals based on the value of the sub-carrier spacing, or transmitting (306), to the first communication node (110), second signals based on the value of the sub-carrier spacing.

46. The communication system of embodiment 45, further including the second communication node.

47. The communication system of embodiment 46, further including the first communication node, wherein the first communication node comprises a radio interface configured to communicate with the second communication node and a communication interface configured to forward to the host computer the user data carried by a transmission from the second communication node to the first communication node.

48. The communication system of embodiment 46 or 47, wherein the processing circuitry of the host computer is configured to execute a host application; and the second communication node's processing circuitry is configured to execute a client application associated with the host application, thereby providing the user data.

49. The communication system of embodiment 46 or 47, wherein: the processing circuitry of the host computer is configured to execute a host application, thereby providing request data; and the second communication node's processing circuitry is configured to execute a client application associated with the host application, thereby providing the user data in response to the request data.

51. A method implemented in a second communication node, comprising
receiving, from the first communication node (110), information of a value of sub-carrier spacing determined based on a delay spread of first signals sent between the first communication node (110) and the second communication node (120), and
receiving, from the first communication node (110), second signals based on the value of the sub-carrier spacing, or transmitting (306), to the first communication node (110), second signals based on the value of the sub-carrier spacing.

52. The method of embodiment 51, further comprising: providing user data; and forwarding the user data to a host computer via the transmission to the first communication node.

55. A method implemented in a communication system including a host computer, a first communication node and a second communication node, the method comprising:
at the host computer, receiving user data transmitted to the first communication node from the second communication node, wherein the second communication node is:
receiving, from the first communication node (110), information of a value of sub-carrier spacing determined based on a delay spread of first signals sent between the first communication node (110) and the second communication node (120), and
receiving, from the first communication node (110), second signals based on the value of the sub-carrier spacing, or transmitting (306), to the first communication node (110), second signals based on the value of the sub-carrier spacing.

56. The method of embodiment 55, further comprising: at the second communication node, providing the user data to the first communication node.

57. The method of embodiment 56, further comprising: at the second communication node, executing a client application, thereby providing the user data to be transmitted; and at the host computer, executing a host application associated with the client application.

58. The method of embodiment 56, further comprising: at the second communication node, executing a client application; and at the second communication node, receiving input data to the client application, the input data being provided at the host computer by executing a host application associated with the client application, wherein the user data to be transmitted is provided by the client application in response to the input data.

65. A communication system including a host computer comprising a communication interface configured to receive user data originating from a transmission from a second communication node to a first communication node, wherein the first communication node comprises a radio interface and processing circuitry, the first communication node's processing circuitry configured for:
obtaining information of a delay spread of first signals sent between the first communication node (110) and the second communication node (120);
determining at least one of a plurality of different values of a sub-carrier spacing for transmission of second signals between the first communication node (110) and the second communication node (120), based on the obtained information of the delay spread, and
initiating transmission of the second signals between the first communication node (110) and the second communication node (120) based on the determined at least one value of the sub-carrier spacing.

66. The communication system of embodiment 65, further including the first communication node.

67. The communication system of embodiment 66, further including the second communication node, wherein the second communication node is configured to communicate with the first communication node.

68. The communication system of embodiment 67, wherein: the processing circuitry of the host computer is configured to execute a host application; and the second communication node is configured to execute a client application associated with the host application, thereby providing the user data to be received by the host computer.

75. A method implemented in a communication system including a host computer, a first communication node and a second communication node, the method comprising: at the host computer, receiving, from the first communication node, user data originating from a transmission which the first communication node has received from the second communication node, wherein the second communication node is:
obtaining information of a delay spread of first signals sent between the first communication node (110) and the second communication node (120);
determining at least one of a plurality of different values of a sub-carrier spacing for transmission of second signals between the first communication node (110) and the second communication node (120), based on the obtained information of the delay spread, and
initiating transmission of the second signals between the first communication node (110) and the second communication node (120) based on the determined at least one value of the sub-carrier spacing.

76. The method of embodiment 75, further comprising: at the first communication node, receiving the user data from the second communication node.

77. The method of embodiment 76, further comprising: at the first communication node, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for improving transmission link performance, performed by a first communication node for wireless communication with a second communication node, the method comprising:
obtaining information of a delay spread of first signals sent between the first communication node and the second communication node;
determining at least one of a plurality of different values of a sub-carrier spacing for transmission of second signals between the first communication node and the second communication node based on the obtained information of the delay spread,
wherein the plurality of different values of the sub-carrier spacing comprises a first value and a second value higher than the first value, and
wherein the determining comprises:
comparing the delay spread to a threshold, and when the delay spread is equal to or above the threshold, selecting the first value, and when the delay spread is below the threshold, selecting the second value;
sending to the second communication node, information of the determined at least one value of the sub-carrier spacing for transmission of second signals between the first communication node and the second communication node; and
initiating transmission of the second signals between the first communication node and the second communication node based on the determined at least one value of the sub-carrier spacing.

2. The method according to claim 1, further comprising:
obtaining information of a first group of time-frequency resources for transmitting the second signals based on the first value and of a second group of time-frequency resources for transmitting the second signals based on the second value, and
when the first value is selected, initiating transmission of the second signals based on any of the time-frequency resources of the first group, and
when the second value is selected, initiating transmission of the second signals based on any of the time-frequency resources of the second group.

3. The method according to claim 2, wherein the information of the first group of time-frequency resources or of the second group of time-frequency resources is obtained based on one or more of a pre-defined rule and a configuration received from the second communication node or any other communication node.

4. The method according to claim 1, wherein the determining is based on one or more of: signal quality, phase noise, channel bandwidth and transmit power of the first signal sent between the first and second communication node, and relative velocity of the first communication node compared to the second communication node.

5. The method according to claim 4, wherein the determining based on the delay spread as first priority, and the signal quality and/or the transmission power of the first signal as second priority.

6. The method according to claim 1, further comprising: determining a cyclic prefix length based on the obtained information of the delay spread, and wherein the at least one of the plurality of different values of the sub-carrier spacing is determined also based on the determined cyclic prefix length.

7. The method according to claim 1, further comprising: determining relative velocity between the first communication node and the second communication node, and wherein the obtaining of information of a delay spread and the determining of at least one value of sub-carrier spacing is performed more frequently for a first relative velocity than for a second relative velocity whose magnitude is lower than a magnitude of the first relative velocity.

8. A method performed by a second communication node for wireless communication with a first communication node, the method comprising:
receiving, from the first communication node, information of a value of sub-carrier spacing determined based on a delay spread of first signals sent between the first communication node and the second communication node,
wherein the value of the sub-carrier spacing comprises a first value and a second value higher than the first value, and
wherein the determining comprises:
comparing the delay spread to a threshold, and when the delay spread is equal to or above the threshold, selecting the first value, and when the delay spread is below the threshold, selecting the second value; and
receiving, from the first communication node, second signals based on the value of the sub-carrier spacing, or transmitting, to the first communication node, second signals based on the value of the sub-carrier spacing.

9. The method according to the claim 8, further comprising:
transmitting, to the first communication node, information of a first group of time-frequency resources to be used by the first communication node for initiating transmission of second signals using the first value of sub-carrier spacing, and information of a second group of time-frequency resources to be used by the first communication node for initiating transmission of second signals using the second value of sub-carrier spacing.

10. The method according to claim 8, wherein when the second signals are received from the first communication node or transmitted to the first communication node on any of time-frequency resources of a first group, the first value of sub-carrier spacing is used, and when the second signals are received from the first communication node or transmitted to the first communication on any of time-frequency resources of a second group, the second value of sub-carrier spacing is used.

11. A first communication node operable in a wireless communication system, for wireless communication with a second communication node, the first communication node comprising processing circuitry and a memory, said memory containing instructions executable by said processing circuitry, whereby the first communication node is operative for:
obtaining information of a delay spread of first signals sent between the first communication node and the second communication node;
determining at least one of a plurality of different values of a sub-carrier spacing for transmission of second signals between the first communication node and the second communication node, based on the obtained information of the delay spread,
wherein the plurality of different values of the sub-carrier spacing comprises a first value and a second value higher than the first value, and
wherein the first communication node is operative for:
determining the at least one of a plurality of different values by comparing the delay spread to a threshold, and when the delay spread is equal to or above the threshold, selecting the first value, and when the delay spread is below the threshold, selecting the second value;
sending to the second communication node, information of the determined at least one value of the sub-carrier spacing for transmission of second signals between the first communication node and the second communication node; and
initiating transmission of the second signals between the first communication node and the second communication node based on the determined at least one value of the sub-carrier spacing.

12. The first communication node according to claim 11, further being operative for obtaining information of a first group of time-frequency resources for transmitting the second signals based on the first value and of a second group of time-frequency resources for transmitting the second signals based on the second value, and when the first value is selected, the first communication node is operative for:
initiating the transmission of the second signals based on any of the time-frequency resources of the first group, and when the second value is selected, the first communication node is operative for initiating the transmission of the second signals based on any of the time-frequency resources of the second group.

13. The first communication node according to claim 11, wherein the first communication node is operative for:
determining the at least one of a plurality of different values based on one or more of: signal quality, phase noise, channel bandwidth and transmit power of the first signal sent between the first and second communication node, and relative velocity of the first communication node compared to the second communication node or based on the delay spread as first priority, and the signal quality and/or the transmission power of the first signal as second priority.

14. The first communication node according to claim 13, operative for: determining the at least one of a plurality of different values based on the delay spread as first priority, and the signal quality and/or the transmission power of the first signal as second priority.

15. The first communication node according to claim 11, further being operative for:
determining a cyclic prefix length based on the obtained information of the delay spread, and wherein the determining of the at least one of the plurality of different values of the sub-carrier spacing is also based on the determined cyclic prefix length.

16. A second communication node operable in a wireless communication system, for wireless communication with a first communication node, the second communication node comprising a processing circuitry and a memory, said memory containing instructions executable by said processing circuitry, whereby the second communication node is operative for:

receiving, from the first communication node, information of a value of sub-carries spacing determined based on a delay spread of first signals sent between the first communication node and the second communication node, wherein the value of the sub-carrier spacing comprises a first d a second value higher than the first value, and wherein the determining comprises:

comparing the delay spread to a threshold, and when the delay spread is equal to or above the threshold, selecting the first value, and when the delay spread is below the threshold, selecting the second value; and receiving, from the first communication node, second signals based on the value of the sub-carrier spacing, or transmitting, to the first communication node, second signals based on the value of the sub-carrier spacing.

17. The second communication node according to claim 16, further being operative for:

transmitting, to the first communication node, information of a first group of time-frequency resources to be used by the first communication node for initiating transmission of second signals using the first value of sub-carrier spacing, and information of a second group of time-frequency resources to be used by the first communication node for initiating transmission of second signals using the second value of sub-carrier spacing.

18. The second communication node according to claim 16, further operative for:

when the second signals are received from the first communication node or transmitted to the first communication node on any of time-frequency resources of a first group, using the first value of sub-carrier spacing, and when the second signals are received from the first communication node or transmitted to the first communication node on any of time-frequency resources of a second group, using the second value of sub-carrier spacing.

* * * * *